United States Patent [19]

Winslow

[11] 4,234,837
[45] Nov. 18, 1980

[54] DIGITAL CENTER TRACKING SYSTEM
[75] Inventor: John S. Winslow, Altadena, Calif.
[73] Assignee: MCA Discovision, Inc., Universal City, Calif.
[21] Appl. No.: 3,020
[22] Filed: Jan. 12, 1979
[51] Int. Cl.³ .............................................. G05B 19/33
[52] U.S. Cl. .................................. 318/577; 318/576; 318/640; 360/77; 358/128.5; 250/202
[58] Field of Search ............... 318/561, 576, 577, 624, 318/640; 250/202; 360/77; 358/128; 179/100.3 D, 100.3 V

[56] References Cited
U.S. PATENT DOCUMENTS

| | | | |
|---|---|---|---|
| 3,994,016 | 11/1976 | Moghadam | 360/77 |
| 4,037,252 | 7/1977 | Janssen | 250/202 |
| 4,063,287 | 12/1977 | Van Rosmalen | 250/202 |
| 4,138,741 | 2/1979 | Hedlund et al. | 360/77 |
| 4,160,270 | 7/1979 | Goldschmidt et al. | 358/128 |

Primary Examiner—Truhe J. V.
Assistant Examiner—Eugene S. Indyk
Attorney, Agent, or Firm—Ronald J. Clark

[57] ABSTRACT

A digital servo system for maintaining a detection device, such as a reading beam, as nearly as possible centered with respect to an information track, such as an optical track on a video recording disc. In each of the embodiments disclosed, circuitry is provided to process a signal obtained from the reading beam, to obtain timing signals indicative of transitions of the beam across noncentral switching lines parallel with the track. In one embodiment, a constant-magnitude acceleration signal is applied to a beam position transducer, and is reversed in polarity each time a switching line is crossed after first crossing the centerline. In another embodiment, the polarity of the constant-magnitude acceleration signal is reversed after crossing a switching line a second time and after applying an additional acceleration impulse of relatively short duration. In a third embodiment, an acceleration impulse is initiated when the beam reaches a switching line, and the beam moves at essentially constant velocity when not subject to an acceleration pulse.

17 Claims, 17 Drawing Figures

DIGITAL CENTER TRACKING SYSTEM

BACKGROUND OF THE INVENTION

This invention relates generally to systems for the reproduction of recorded information, such as video information recorded on a disc, and, more particularly, to systems for maintaining a light beam essentially centered on an information track on such a disc.

Video and other types of information can be stored on a disc as a succession of light reflective and non-reflective regions along a spiral information track on the surface of a disc-shaped record carrier. In reproducing the video information, a video disc player employs an optical system for directing a radiant reading beam, such as a laser beam, onto the information track, and for detecting a reflected beam indicative of the reflectivity of the disc surface scanned by the laser beam as the disc is rotated. In a disc player of the type in which the invention may be usefully employed, the intensity of the reflected beam takes the form of a high-frequency carrier signal which is frequency modulated by the video information.

In order to store a reasonably large amount of information on the disc, successive turns of the information track must be so closely spaced that even a slight degree of disc eccentricity would cause the beam to transverse a number of adjacent tracks on each revolution. Consequently, some means must be provided for applying transverse or radial corrections to the beam position, so that it substantially follows along the center of the information track.

Applying conventional analog servo system theory to this problem presents some difficulty, since the response characteristic of the disc is symmetrical about the track centerline, and the system must determine in which direction to apply a correction when the beam deviates from the centerline. An alternative but generally unsatisfactory analog approach is to select a non-central position as a null point for the servo system. Other disadvantages of analog servo systems are their relative complexity, and the necessity for precise and continual adjustment of components. Consequently, there is still a real need for a simple and reliable technique for maintaining a reading beam substantially in the center of an information track. The present invention has as its principal objective a digital system, as opposed to an analog system, for controlling the position of the beam with respect to the track centerline.

SUMMARY OF THE INVENTION

The present invention resides in apparatus and a corresponding method for its use, for correcting the position of a detection means, such as a beam used to read information from a recording track, wherein a fixed-magnitude acceleration signal is applied to a beam positioning transducer under control of a timing signal indicative of times at which the beam traverses non-central switching lines parallel to the center of the track.

Basically, and in general terms, the apparatus of the invention comprises first transducer means for moving a detection means transversely with respect to the information track, second transducer means for deriving an information signal from the detection means, and means for low-pass filtering the information signal to derive an error signal indicative of the position of the detection means with respect to the track centerline. More importantly, the apparatus also includes means for processing the error signal to derive a timing signal indicative of the times at which the position of the detection means corresponds with the positions of non-central switching lines located at preselected distances from the track centerline, and means responsive to the timing signal, for controlling the polarity and duration of an acceleration signal applied to the first transducer means, to accelerate the detection means towards a corrected position.

In one illustrative embodiment of the invention, the switching lines are located relatively close to, but not coincident with, the track centerline, the acceleration force applied to the transducer means is of constant magnitude, and its direction is reversed each time a switching line is crossed after first crossing the centerline. Consider, for example, that the beam is being accelerated toward the centerline, from left to right. After crossing the centerline, the beam encounters a right-hand switching line, which has the effect of switching the polarity of the acceleration, such that the beam is then accelerated back toward the centerline. After the beam slows and reverses its direction, it crosses the centerline again and encounters the left-hand switching line, after which it slows and again reverses direction. The apparatus of this embodiment of the invention includes means for generating a first timing signal indicative of times when the beam moves beyond the switching lines, means for processing the first timing signal to obtain a second timing signal indicative of transitions through switching lines, means for filtering the second timing signal to obtain a third timing signal indicative of first transitions through a switching line following transitions through the centerline, and gating means for switching the polarity of a constant-magnitude acceleration signal in accordance with the third timing signal.

In accordance with a second embodiment of the invention, a combination of a constant-magnitude acceleration signal and a short-duration acceleration pulse is applied to the beam positioning transducer. The switching lines are spaced relatively far from the centerline, and, when a switching line is crossed for a second time, the constant-magnitude acceleration is reversed and an acceleration impulse, having the same sign as the constant-magnitude signal before switching, is applied. For example, when the beam is moving from left to right across the centerline, it is slowed by a right-to-left acceleration. The beam crosses the right-hand switching line, reverses direction, and again encounters the same switching line. At this time, a negative or right-to-left acceleration impulse is applied, and the sign of the constant acceleration force is changed to left-to-right. The beam then crosses the centerline again, crosses the left-hand switching line, reverses, and again encounters the left-hand switching line. Then a left-to-right acceleration pulse is applied and the constant acceleration force is again reversed. The apparatus of the second embodiment of the invention includes means for generating a first timing signal indicative of those times when the beam moves beyond the switching lines, means for processing the first timing signal to obtain a second timing signal indicative of transitions through switching lines, means for filtering the second timing signal to obtain a third timing signal indicative of second transitions through the same switching line, and gating means for switching the polarity of the constant acceleration signal and the impulse acceleration signal to be applied to the beam positioning transducer.

In accordance with a third and, presently, most preferred embodiment of the invention, the beam is caused to oscillate at essentially constant velocity between two spaced switching lines, and pulses of acceleration are applied only when the switching lines are encountered. Thus, for example, the beam proceeds from left to right at essentially constant velocity until it encounters the right-hand switching line, at which point an acceleration impulse of relatively short duration is applied to accelerate the beam to the left. Then, the beam is deflected at essentially constant velocity toward the left-hand switching line, at which point a right-directed acceleration pulse is applied to begin moving the beam back toward the right again. In this third embodiment, the apparatus of the invention includes means for generating a first timing signal indicative of times at which the beam passes beyond the limits of the switching lines, and gating means for applying an acceleration impulse signal to the beam position transducer in alternate directions and at times determined by the timing signal.

It will be appreciated from the foregoing that the present invention represents a significant advance in the field to video disc reproduction systems, as well as in data retrieval systems in general. In particular, the invention provides a simple and reliable digital technique for ensuring that the beam used to read video information accurately follows the center of the information track on the disc. Other aspects and advantages of the invention will become apparent from the following more detailed description, taken in conjunction with the accompanying drawings.

BRIEF DESCRIPTION OF THE DRAWINGS

FIG. 3c is a graph showing a timing signal obtained from the comparator of FIG. 2 when the switching lines are positioned as shown in FIG. 3a;

DESCRIPTION OF THE PREFERRED EMBODIMENTS

Figure 1:
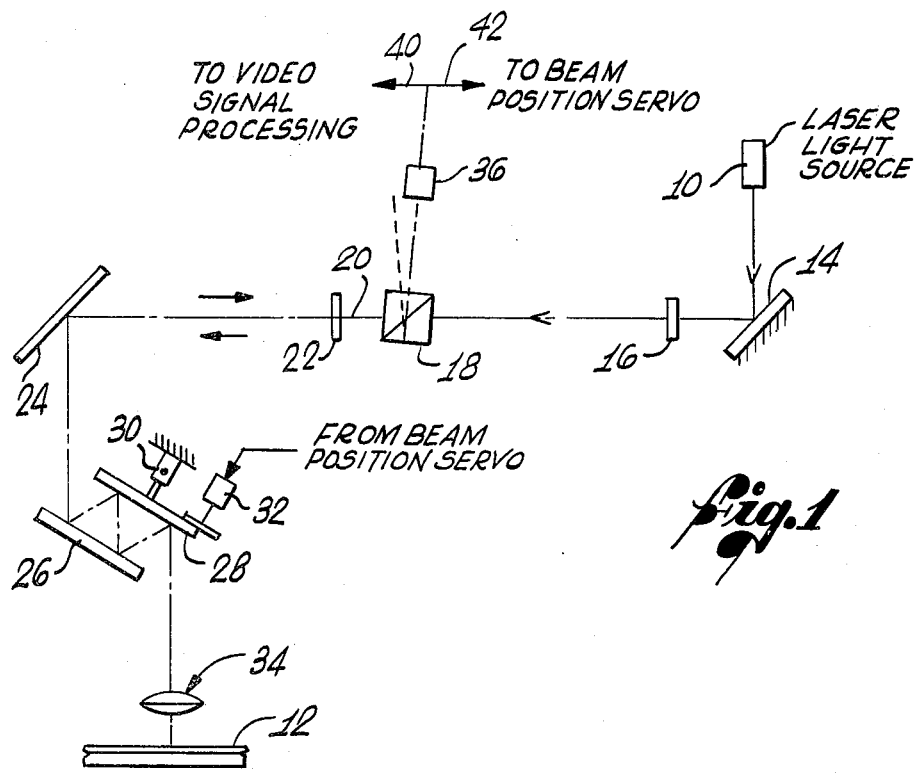
FIG. 1 is a simplified diagrammatical view of an optical playback system for video disc recordings.

As shown in the drawings for purposes of illustration, the present invention is concerned with a digital servo control system for maintaining a beam as nearly as possible in alignment with the center of an information track, such as a recording track on video recording disc. In the optical system of video reproduction with which the present invention is principally concerned, video information is stored on a disc in the form of raised bumps or lands on the disc surface, and is read by means of a light beam scanned across the surface. The bumps exhibit a lower total light reflectivity than the flat areas between the bumps. Moreover, since the scanning beam has a width comparable to the bump width, the reflectivity signal obtained when the beam is scanned over a series of the bumps is substantially sinusoidal in nature. Information is encoded on the disc by forming a large number of bumps on a spiral track on the disc surface, such that the resultant reflectivity signal has the form of a sinusoidal carrier, which may be frequency modulated with the video information.

Since most discs, especially those produced for consumer use, will have relatively large eccentricities, some means must be provided for maintaining the reading beam centered on the information track as closely as possible. When only a single reading beam is utilized both for obtaining information recorded on the track and for obtaining an error signal for centering the beam, accurate centering may not be possible, since the response characteristics of the track are such that a like error signal is produced on either side of the centerline.

As shown in FIG. 1, in a typical optical playback assembly a laser light source, indicated by reference numeral 10, directs light onto a disc surface 12. The reading beam from the laser is first reflected by a plane mirror 14, and then focused by a lens 16 onto a beam splitting prism 18, the transmitted portion of the beam, indicated at 20, then being directed through a quarter-wave plate 22, and thence reflected from two successive fixed mirrors 24 and 26, and then from a movable mirror 28. The movable mirror is pivotally mounted, as shown at 30, and is adjustable in angle by means of a transducer 32. Finally, the beam is passed through an objective lens system 34 and focused onto the disc 12. A beam reflected from the disc follows essentially the same path back to the beam splitting prism 18, at which point the reflected beam is further reflected by the prism to a light detector 36.

The detector 36 is a photoelectric transducer from which an output signal is transmitted to video signal processing circuitry, as indicated at 40, and to a beam position servo mechanism, over line 42. Typically, the reading beam is made to follow the spiral track by translating the entire optical playback assembly radially across the disc at a constant speed, with corrections for eccentricity and other tracking errors being made by means of the mirror positioning transducer 32, in accordance with a control signal supplied over line 44.

The characteristics of the disc 12 are such that the reflectivity is maximum when the reading beam is positioned exactly between tracks, and is minimum when the reading beam is positioned over the center of the track. The response characteristic varies approximately sinusoidally in a radial direction, since the bump at the center of the track is less reflective than the wider flat area between tracks, and the width of the reading beam is comparable in size to the width of the bump. It will be appreciated, therefore, that the reflectivity signal, after low-pass filtering to remove carrier-frequency components due to bumps traversed along the direction of the track, will provide a signal indicative of the position of the reading beam with respect to the track centerline.

In accordance with the present invention, the beam position is controlled by a digital servo system, which includes means for detecting the transition of the beam through switching lines spaced a preselected distance from the track centerline, and means for applying a fixed-magnitude acceleration signal to the beam position transducer, based on detection of crossings of the switching lines. In each of three embodiments of the invention, shown in FIGS. 2, 5 and 7, respectively, signals from the light detector 36 are passed through an amplifier 50, a low-pass filter 52, and a negative peak detector 56, after which the signals are processed by a summing amplifier 58 and a comparator 60.

Figure 3A:
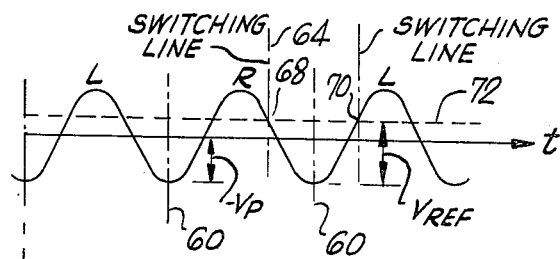
FIG. 3a is a graph showing the time variation of an error signal obtained by low-pass filtering and phase compensating a signal derived from the information track.

As mentioned earlier, the signal from the light detector 36 includes a carrier-frequency component derived from transitions over bumps and lands along the direction of the track. This high-frequency component is removed by the low-pass filter 52. By means of ac coupling in the amplifier 50, or in the filter 52, a signal substantially like that shown in FIG. 3a is obtained. The waveform of FIG. 3a is obtained when the beam oscillates from side to side of the track centerline, under the influence of an alternating accelerating force, the effect of which will be described in more detail. In FIG. 3a and other related timing diagrams, the letters L and R are used to indicate excursions of the beam to the left and right, respectively, of the track centerline, which, in FIG. 3a, is at a position on the time axis corresponding to the minimum or negative peak values of the signal, as indicated at 62. Moreover, if one were to consider switching lines parallel with the centerline and spaced on each side of it, as indicated at 64 and 66, the signal value when the beam was positioned precisely over the switching lines would be as shown at 68 and 70, respectively.

Figure 3B:
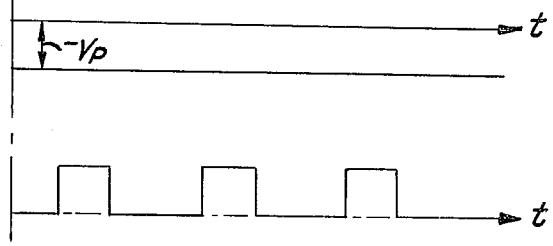
FIG. 3b is a graph showing the signal obtained from the negative peak detector of FIG. 2.
Figure 3C:
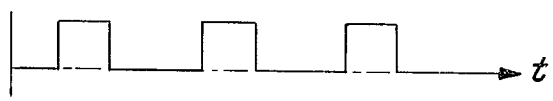

In order to generate timing signals for controlling the application of an acceleration signal to the beam positioning transducer 32 in accordance with detection of crossings of the switching lines, it is necessary to determine when the error signal of FIG. 3a passes through the threshold value, indicated by the line broken line 72, which passes through points 68 and 70 and corresponds to transitions through the switching lines. The negative peak detector 56 determines the signal voltage corresponding to the negative peaks, i.e. at the centerline positions of FIG. 3a, as shown in FIG. 3b. This voltage is indicated as $-V_p$. Then a fixed voltage, indicated as $V_{REF}$, is added to this negative peak value $-V_p$ in the summing amplifier 58. $V_{REF}$ is a voltage equal to the difference between $-V_p$ and the voltage at points 68 and 70, and is selected to provide a desired distance between the switching lines 64 and 66 and the centerline 60. The instantaneous value of the error signal shown in FIG. 3a is transmitted over line 74 to the comparator 60, and is there compared with the threshold value obtained from the summing amplifier 58 over line 76. A timing signal, such as that shown in FIG. 3c is thereby generated, indicating the times at which the error signal exceeds the threshold switching value defined by the broken line 72. The comparator 60 is designed to provide an output only when the signal applied to it over line 74 exceeds the value of the signal applied to it over line 76.

Figure 2:
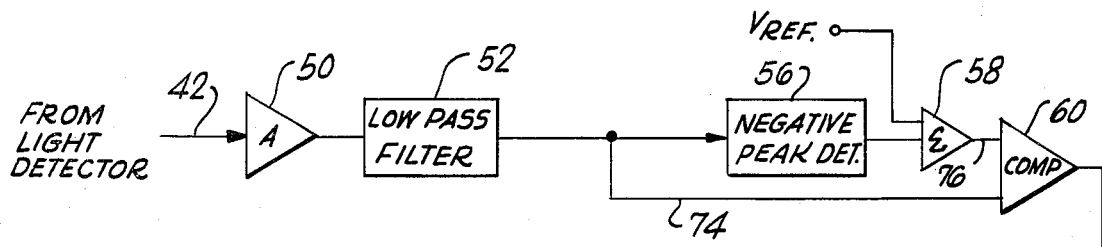
FIG. 2 is a block diagram of a first embodiment of a digital beam position servo control system utilizing the present invention.
Figure 2:
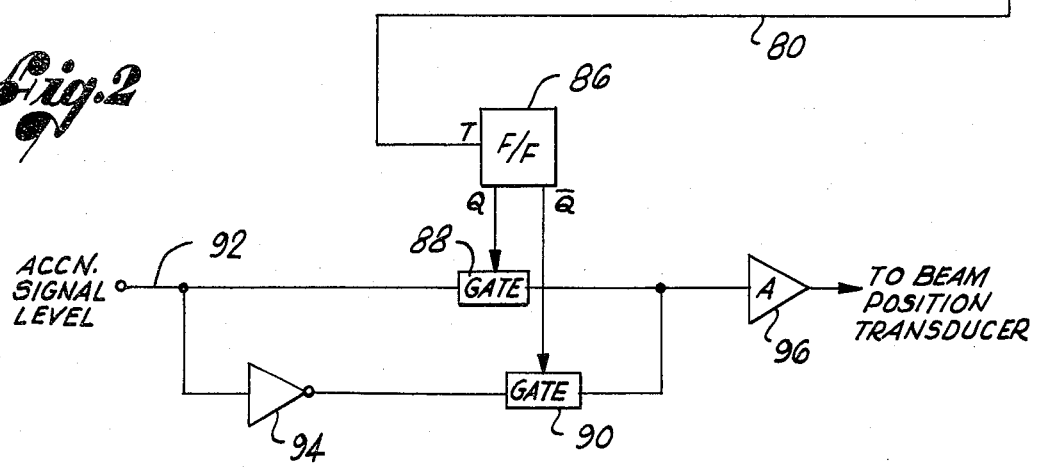

In the embodiment of the invention shown in FIG. 2, the value of $V_{REF}$ is selected to provide switching lines relatively close to the centerline. Thus the output signal from the comparator 60 of FIG. 2 is similar to that shown in FIG. 4a. The comparator output, on line 80, is applied to the toggle terminal of a flip-flop 86, the Q and $\overline{Q}$ outputs of which are applied to two gates 88 and 90. An acceleration signal in the form of a constant-magnitude voltage is applied over line 92 directly to one gate 88, and is applied after reversal by an inverter 94 to the other gate 90. The outputs of the gates are together applied to an amplifier 96, and thence to the beam position transducer 32.

Figure 4:
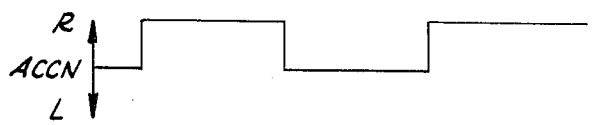
FIG. 4 is a graph showing the acceleration signal applied to the beam position transducer in the system of FIG. 2.

The operation of the apparatus in FIG. 2 can best be appreciated by considering the waveforms shown in FIGS. 3a–4. The output of the comparator 60 (FIG. 2) is shown in FIG. 3c. The leading edges of these positive pulses are used to toggle the flip-flop 86, which, in turn, is used to gate either a positive or a negative acceleration signal to the beam positioning transducer 32.

Figure 9:
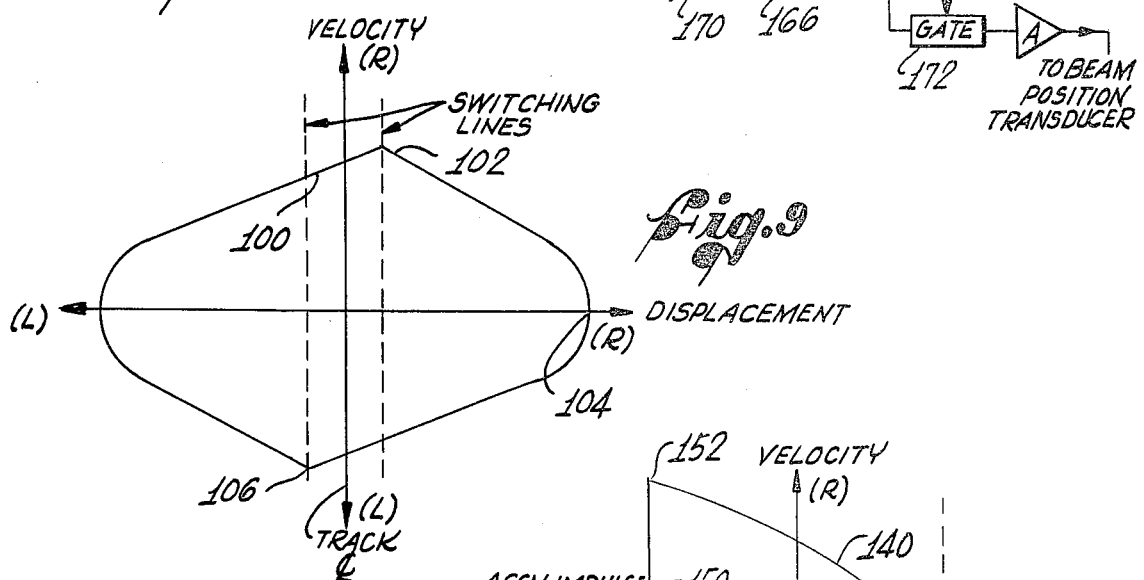
FIG. 9 is a typical displacement-velocity diagram for the system illustrated in FIG. 2.

It will be appreciated from the drawings that the acceleration signal is switched in polarity whenever the beam crosses a switching line after first crossing the centerline. The effect of this polarity switching on the beam position and velocity is apparent in the displacement-velocity diagram of FIG. 9. It will be seen from this figure that, for example, when the beam swings in toward the track centerline from the left, as indicated at 100, it is under the influence of a positive or right-directed acceleration until it first crosses the centerline and then crosses the right-hand switching line. At this point, indicated at 102, the acceleration is reversed, and remains negative, or left-directed, while the beam swings all the way to its right-most point 104, and back again across the centerline to the left hand switching line, where, as indicated at 106, the acceleration force is again reversed.

Figure 5:
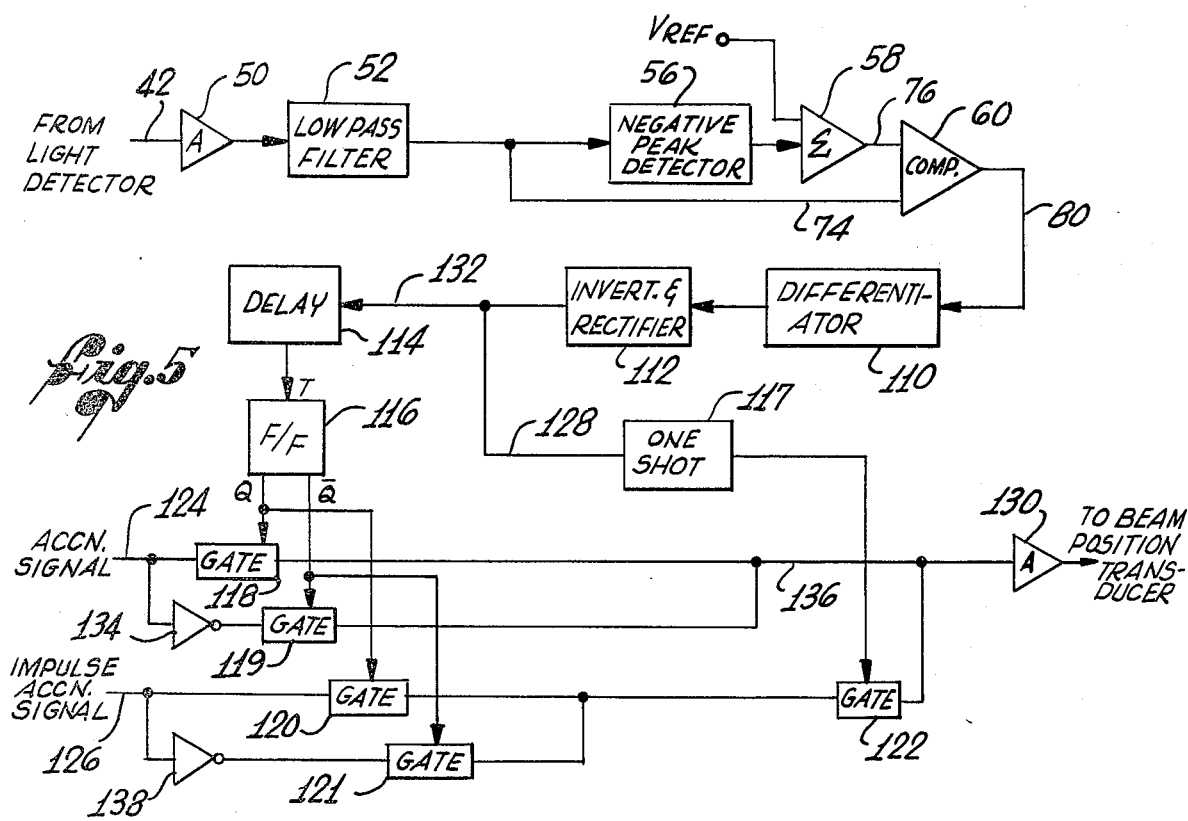
FIG. 5 is a block diagram of a second embodiment of a digital servo control system utilizing the present invention.
Figure 6A:
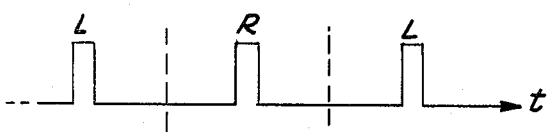
FIG. 6a is a graph showing a timing signal obtained from the comparator of FIG. 5.
Figure 6B:
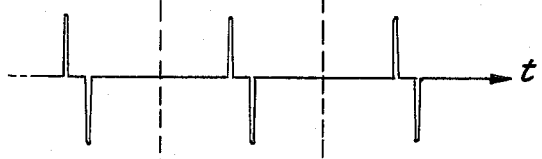
FIG. 6b is a graph showing the signal obtained from the differentiator of FIG. 5.
Figure 6C:
FIG. 6c is a graph showing the signal obtained from the inverter and rectifier of FIG. 5.

In the embodiment of the invention shown in FIG. 5, the apparatus further includes a differentiator 110, together with an inverter and rectifier circuit 112, a delay circuit 114, a flip-flop 116, a one-shot circuit 117, and five gates 118–122. In accordance with this embodiment of the invention, a constant-magnitude acceleration signal, provided on line 124, is combined with a higher magnitude impulse acceleration signal on line 126 in accordance with the detected times of crossings of switching lines. In this instance, the switching lines are spaced further from the centerline than in the previously described embodiment, and the signal obtained from the comparator 60 is essentially as shown in FIG. 6a. The comparator output is applied to the differentiator 110 over line 80, to yield the signal shown in FIG. 6b. Inversion and rectification by the circuit 112 eliminates the positive-going pulses from the FIG. 6b waveform and inverts the remaining negative-going pulses, as shown in FIG. 6c. The signal shown in FIG. 6c, representing the output of the inverter and rectifier circuit 112, is applied over line 128 to the one-shot circuit 117, to fix the duration of the pulses, and thence to gate 122, which controls the flow of an impulse acceleration signal to an amplifier 130, the output of which is applied to the beam position transducer 32. The FIG. 6c timing signal is also transmitted over line 132 to the delay circuit 114, and thence to the toggle terminal of the flip-flop 116.

The Q output of the flip-flop 116 is employed to control gates 118 and 120, and the $\overline{Q}$ output is employed to control gates 119 and 121. In much the same way as in the FIG. 2 embodiment, the acceleration signal on line 124 is applied in normal or inverted form through either gate 118, or gate 119 and inverter 134, thence over line 136 to the amplifier 130.

Figure 6D:
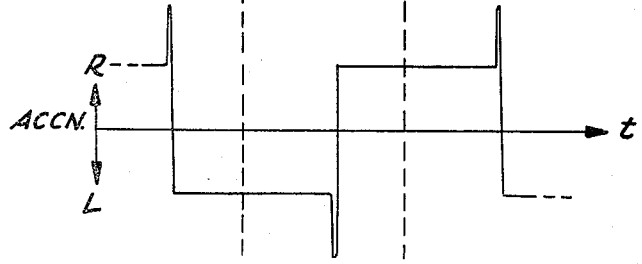
FIG. 6d is a graph showing the acceleration signal applied to the beam position transducer in the system of FIG. 5.

The impulse acceleration signal on line 126 is also either applied directly to the amplifier 130, through gate 120 and gate 122, or is inverted first in inverter 138 and then applied to gate 122. Because of the action of the delay circuit 114, the flip-flop 116 will not be toggled until after gate 122 has been opened to allow application of the impulse acceleration signal. Thus, the composite acceleration signal applied to the amplifier 130, and thence to the beam position transducer 32, will be of the form shown in FIG. 6d, there being an acceleration impulse immediately before switching of the polarity of the constant-magnitude acceleration signal.

Figure 10:
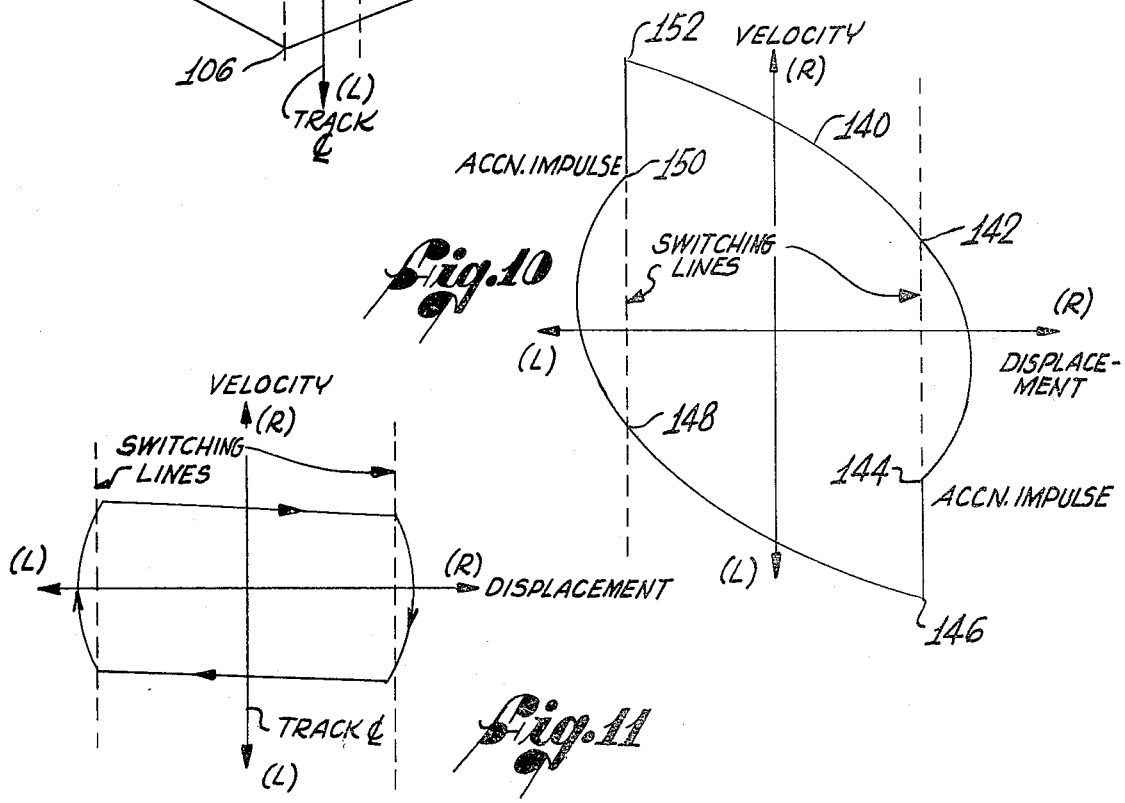
FIG. 10 is a typical displacement-velocity diagram for the system illustrated in FIG. 5.

It will also be appreciated that, in the FIG. 5 embodiment, the reading beam will be required to transverse a switching line twice before triggering switching of the acceleration polarity. Accordingly, the displacement-velocity diagram is essentially as shown in FIG. 10. When the beam is traversing the centerline in a positive or right-hand direction, as indicated at 140, it is subjected to a constant negative acceleration force which continues while the beam crosses the right-hand switching line a first time, as indicated at 142. When the beam reverses direction and encounters the right-hand switching line a second time, as indicated at 144, an acceleration pulse is applied in the same direction, i.e. the negative direction, and the acceleration is reversed in direction, as shown at 146, and the beam continues its movement from right to left, subject to a positive acceleration. Similarly, when the beam encounters the left-hand switching line for the first time, at 148, the acceleration is unchanged. But when the beam encounters the left-hand switching line for a second time, at 150, a positive acceleration pulse is applied, and then the constant acceleration is again reversed, as shown at 152, and the beam continues its movement back toward the centerline.

Figure 8A:
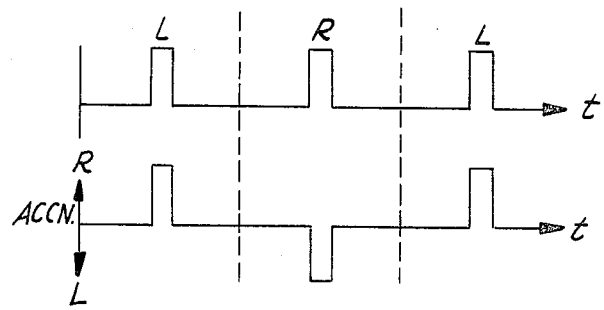
FIG. 8a is a graph showing a timing signal obtained from the comparator of FIG. 7.
Figure 7:
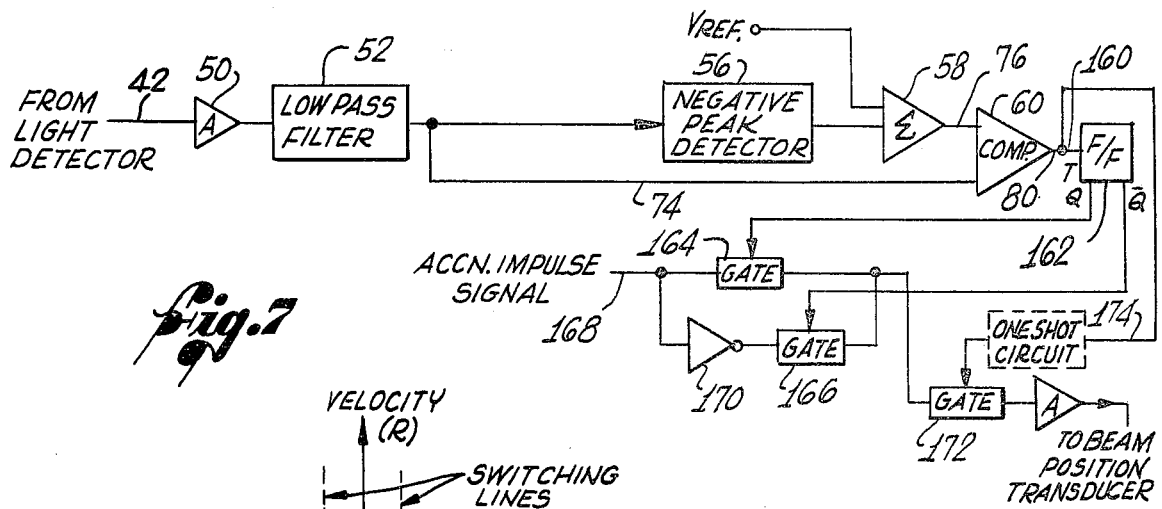
FIG. 7 is a block diagram of a third embodiment of a digital servo control system utilizing the present invention.

In a third embodiment of the invention, shown in FIG. 7, there is no constant-magnitude acceleration force. Instead, an acceleration impulse is applied only when the beam encounters a switching line. Again, the switching lines are selected to be relatively widely spaced from the centerline, and the output of the comparator 60 in FIG. 7 is essentially as shown in FIG. 8a. In this embodiment, the comparator output on line 80 is applied over line 160 directly to the toggle terminal of a flip-flop 162, the Q and $\overline{Q}$ outputs from which are applied to two gates 164 and 166 controlling the flow of an acceleration impulse signal supplied on line 168, and the inverted form of the acceleration signal derived from an inverter 170. Either the inverted or the non-inverted acceleration signal is applied to a third gate 172, which is controlled by the timing signal output of the comparator, applied over line 174. The output signal from this latter gate 172 is then applied to an amplifier 176, and thence to the beam position transducer 32.

Figure 8B:
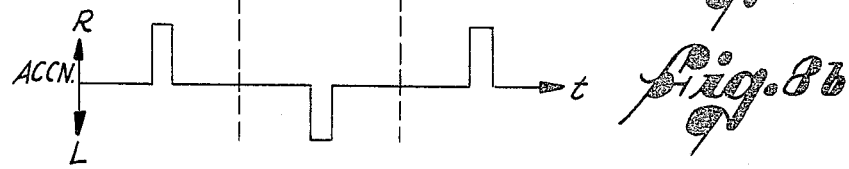
FIG. 8b is a graph showing the acceleration signal applied to the transducer of FIG. 7.
Figure 11:
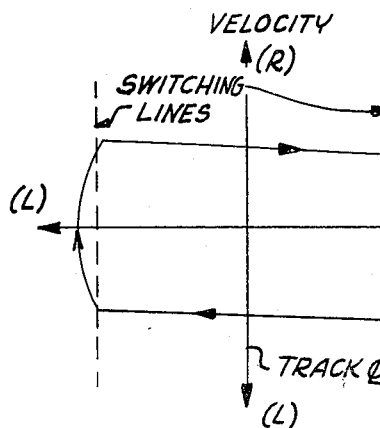
FIG. 11 is a typical displacement-velocity diagram for the system illustrated in FIG. 7.

It will be appreciated that, in the FIG. 7 embodiment, the acceleration signal applied to the transducer 32 is essentially of the form shown in FIG. 8b, i.e., a series of acceleration pulses with alternating polarity applied only during those times in which the beam is positioned outside the limits of the switching lines. The corresponding displacement-velocity diagram is shown in FIG. 11. In this instance, the beam proceeds between the switching lines at essentially constant velocity, subject only to damping effects. As soon as the beam encounters a switching line, it is subjected to an acceleration impulse of such polarity as to accelerate the beam back toward the centerline. The duration of the impulse is such that, as soon as the beam recrosses the same switching line, the acceleration impulse is removed, and the beam continues back across the centerline and towards the opposite switching line at essentially constant velocity. Alternatively, instead of using the output of the comparator 60 to control the gate 172 and hence the duration of the acceleration pulse, a one-shot circuit 178, shown in broken lines, may be connected in line 174 to provide an acceleration of any desired duration.

It will be appreciated from the foregoing that the present invention represents a significant advance in center tracking servo systems, especially as applied to the field of video disc reproduction. In particular, the invention provides a simple and reliable digital technique for applying a beam positioning signal to maintain a beam essentially aligned with the center of the information track. It will also be appreciated that, although specific embodiments of the invention have been described in detail for purposes of illustration, various modifications may be made without departing from the spirit and scope of the invention. Accordingly, the invention is not to be limited, except as by the appended claims.

I claim:

1. A digital servo control system for controlling the position of a detection means with respect to an information track, said system comprising:
   first transducer means for moving the detection means transversely with respect to the information track;
   second transducer means for deriving an information signal from the detection means;
   means for filtering the information signal to obtain an error signal indicative of the position of the detection means with respect to the track centerline;
   signal processing means, for processing the error signal to obtain a timing signal indicative of transitions of the detection means through non-central parallel switching lines located at preselected distances from the track centerline; and
   control means, responsive to the timing signal, for controlling the polarity and duration of an acceleration signal applied to said first transducer means to accelerate the detection means toward a corrected position, whereby the detection means is accelerated in alternating directions and oscillates about the track centerline.

2. A digital servo control system as set forth in claim 1, wherein:
   the switching lines are spaced equidistantly on each side of the centerline;
   the error signal is oscillatory, with alternate peaks corresponding to centerline crossings; and
   said signal processing means includes peak detection means, to determine the signal level at peaks corresponding to centerline crossings, means for adding a reference voltage to the detected peak signal level, to obtain a switching signal level corresponding to the signal level at times when the direction means crosses the switching lines, and comparator means, for comparing the error signal with the switching signal level, and generating a first timing signal having one state when the error signal exceeds the switching signal level, and another state at other times.

3. A digital servo control system as set forth in claim 1, wherein:

said signal processing means includes means for generating a first timing signal indicative of times when the detection means moves beyond the switching lines, means for processing the first timing signal to obtain a second timing signal, indicative of first transitions through switching lines following transitions through the centerline; and said control means includes gating means for switching the polarity of constant-magnitude acceleration signal in response to the second timing signal;

whereby the detection means is accelerated toward a first of the switching lines at a constant rate, until the first switching line is reached, and is then accelerated toward the other of the switching lines at the same constant rate.

4. A digital servo control system as set forth in claim 1, wherein:

said signal processing means includes means for generating a first timing signal indicative of times when the detection means moves beyond the switching lines, means for processing the first timing signal to obtain a second timing signal indicative of all transitions through switching lines, and means for filtering the second timing signal to obtain a third timing signal indicative of second transitions through switching lines; and said control means includes bistable circuit means responsive to the third timing signal to provide a polarity signal, first gating means controlled by the polarity signal to select an inverted or non-inverted first constant-magnitude acceleration signal for application to said first transducer means, second gating means controlled by the polarity signal to select an inverted or non-inverted second constant-magnitude acceleration signal, and third gating means responsive to the third timing signal, to apply the second constant magnitude signal as an acceleration impulse at the times of second transitions through switching lines;

whereby the detection means, as it approaches a first of the switching lines, is accelerated at a constant rate toward the second of the switching lines, and, on reaching the first of the switching lines, is given an impulse of acceleration toward the second switching line, and the direction of acceleration is then reversed.

5. A digital servo control system as set forth in claim 1, wherein:

said signal processing means includes means for generating a first timing signal indicative of times when the detection means moves beyond the switching lines; and said control means includes bistable circuit means responsive to the first timing signal to provide a polarity signal that reverses each time a switching line is encountered for the first time after the centerline, first gating means for selecting an acceleration signal of particular polarity in accordance with the polarity signal, and second gating means controlled by the first timing signal to provide an acceleration impulse signal of the selected polarity each time the detection means encounters a switching line after first encountering the centerline;

whereby the detection means moves at essentially constant velocity after each acceleration impulse, across the centerline, and until it encounters the next switching line, at which time it is subjected to an opposite acceleration impulse.

6. A digital servo control system as set forth in claim 5, wherein said second gating means is responsive only to the first timing signal, to provide an acceleration signal of which the duration is determined only by the time during which the detection means is positioned beyond a switching line.

7. A digital servo control system as set forth in claim 5, wherein said second gating means includes a one-shot circuit to provide an acceleration signal of selected duration.

8. A digital servo control system for controlling the position of a reading beam used to derive information from a recording track on a disc, said system comprising:

beam position transducer means for moving the beam transversely with respect to the information track;

detection transducer means for deriving an information signal from the beam;

means for filtering the information signal to obtain an error signal indicative of the beam position with respect to the track centerline;

signal processing means, for processing the error signal to obtain a timing signal indicative of transitions of the beam through non-central parallel switching lines located at preselected distances from the track centerline; and control means, responsive to the timing signal, for controlling the polarity and duration of an acceleration signal applied to said beam position transducer means to accelerate the beam toward a corrected position, whereby the beam is accelerated in alternating directions and oscillates about the track centerline.

9. A digital servo control system as set forth in claim 8, wherein:

the switching lines are spaced equidistantly on each side of the centerline;

the error signal is oscillatory, with alternate peaks corresponding to centerline crossings; and said signal processing means includes peak detection means, to determine the signal level at the peaks corresponding to centerline crossings, means for adding a reference voltage to the detected peak signal level, to obtain a switching signal level corresponding to the signal level at times when the beam crosses the switching lines, and comparator means, for comparing the error signal with the switching signal level, and generating a first timing signal having one state when the error signal exceeds the switching signal level, and another state at other times.

10. A digital servo control system as set forth in claim 8, wherein:
said signal processing means includes
means for generating a first timing signal indicative of times when the beam moves beyond the switching lines,
means for processing the first timing signal to obtain a second timing signal, indicative of first transitions through switching lines following transitions through the centerline; and
said control means includes gating means for switching the polarity of a constant-magnitude acceleration signal in response to the second timing signal;
whereby the beam is accelerated toward a first of the switching lines at a constant rate, until the first switching line is reached, and is then accelerated toward the other of the switching lines at the same constant rate.

11. A digital servo control system as set forth in claim 8, wherein:
said signal processing means includes
means for generating a first timing signal indicative of times when the beam moves beyond the switching lines,
means for processing the first timing signal to obtain a second timing signal indicative of all beam transitions through switching lines, and
means for filtering the second timing signal to obtain a third timing signal indicative of second transitions through switching lines; and
said control means includes
bistable circuit means responsive to the third timing signal to provide a polarity signal,
first gating means controlled by the polarity signal to select an inverted or non-inverted first constant-magnitude acceleration signal for application to said beam position transducer means,
second gating means controlled by the polarity signal to select an inverted or non-inverted second constant-magnitude acceleration signal, and
third gating means responsive to the third timing signal, to apply the second constant-magnitude signal as an acceleration impulse at the times of second transitions through switching lines;
whereby the beam, as it approaches a first of the switching lines, is accelerated at a constant rate toward the second of the switching lines, and, on reaching the first of the switching lines, is given an impulse of acceleration toward the second switching line, and the direction of acceleration is then reversed.

12. A digital servo control system as set forth in claim 8, wherein:
said signal processing means includes means for generating a first timing signal indicative of times when the beam moves beyond the switching lines; and
said control means includes
bistable circuit means responsive to the first timing signal to provide a polarity signal that reverses each time a switching line is encountered for the first time after the centerline,
first gating means for selecting an acceleration signal of particular polarity in accordance with the polarity signal, and
second gating means controlled by the first timing signal to provide an acceleration impulse signal of the selected polarity each time the beam encounters a switching line after first encountering the centerline;
whereby the beam moves at essentially constant velocity after each acceleration impulse, across the centerline, and until it encounters the next switching line, at which time it is subjected to an opposite acceleration impulse.

13. A method for controlling the position of a detection means with respect to an information track, said method comprising the steps of:
deriving an information signal from the detection means;
filtering the information signal to obtain an error signal indicative of the position of the detection means with respect to the track centerline;
processing the error signal to obtain a timing signal indicative of transitions of the detection means through non-central parallel switching lines located at preselected distances from the track centerline;
generating an acceleration signal for application to the detection means, said generating step including the step of controlling the polarity and duration of the acceleration signal in accordance with the timing signal; and
applying the resulting acceleration signal to the detection means, to move it in an oscillatory fashion about the track centerline.

14. A method as set forth in claim 13, wherein:
the switching lines are spaced equidistantly on each side of the centerline;
the error signal is oscillatory, with alternate peaks corresponding to centerline crossings; and
said processing step includes
detecting the signal level at peaks corresponding to centerline crossings,
adding a reference voltage to the detected peak signal level, to obtain a switching signal level corresponding to the error signal level at times when the direction means crosses the switching lines,
comparing the error signal with the switching signal level, and
generating a first timing signal having one state when the error signal exceeds the switching signal level, and another state at other times.

15. A method as set forth in claim 13, wherein:
said processing step includes
generating a first timing signal indicative of times when the detection means moves beyond the switching lines,
processing the first timing signal to obtain a second timing signal, indicative of first transitions through switching lines following transitions through the centerline; and
said controlling step includes switching the polarity of a constant-magnitude acceleration signal in response to the second timing signal;
whereby the detection means is accelerated toward a first of the switching lines at a constant rate, until the first switching line is reached, and is then accelerated toward the other of the switching lines at the same constant rate.

16. A method as set forth in claim 13, wherein: said processing step includes generating a first timing signal indicative of times when the detection means moves beyond the switching lines, processing the first timing signal to obtain a second timing signal indicative of all transitions through switching lines, and filtering the second timing signal to obtain a third timing signal indicative of second transitions through switching lines; and said controlling step includes generating a polarity signal in response to the third timing signal, selecting an inverted or non-inverted first constant-magnitude acceleration signal for application to said first transducer means, in accordance with the state of the polarity signal, selecting an inverted or non-inverted second constant-magnitude acceleration signal, also in accordance with the state of the polarity signal; and applying the second constant-magnitude signal as an acceleration impulse at the times of second transitions through switching lines, in accordance with the state of the third timing signal;

whereby the detection means, as it approaches a first of the switching lines, is accelerated at a constant rate toward the second of the switching lines, and, on reaching the first of the switching lines, is given an impulse of acceleration toward the second switching line, and the direction of acceleration is then reversed.

17. A method as set forth in claim 13, wherein:

said processing step includes generating a first timing signal indicative of times when the detection means moves beyond the switching lines; and said controlling step includes generating, in response to the first timing signal, a polarity signal that reverses each time a switching line is encountered for the first time after the centerline, selecting an acceleration signal of particular polarity in accordance with the polarity signal, and generating, in response to the first timing signal an acceleration impulse signal of the selected polarity when the detection means moves beyond the switching lines;

whereby the detection means moves for the most part at essentially constant velocity, and is subjected to an acceleration impulse upon first encountering each switching line after crossing the centerline.

* * * * *